(12) United States Patent
Bogoni et al.

(10) Patent No.: US 7,907,316 B2
(45) Date of Patent: Mar. 15, 2011

(54) OPTICAL LOGIC DEVICE FOR PROCESSING OPTICAL SIGNALS

(75) Inventors: Antonella Bogoni, Pisa (IT); Luca Poti, Pisa (IT); Claudio Porzi, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 217 days.

(21) Appl. No.: 12/177,433

(22) Filed: Jul. 22, 2008

(65) Prior Publication Data

US 2009/0116089 A1 May 7, 2009

(30) Foreign Application Priority Data

Jul. 31, 2007 (WO) ............... PCT/EP2007/057922

(51) Int. Cl.
*G02F 3/00* (2006.01)
*G02F 1/03* (2006.01)
*G02F 1/07* (2006.01)

(52) U.S. Cl. .................... 359/108; 359/241; 359/244

(58) Field of Classification Search .............. 359/107, 359/108

See application file for complete search history.

(56) References Cited

U.S. PATENT DOCUMENTS

| 3,431,437 A | * | 3/1969 | Kosonocky | 372/8 |
| 3,813,605 A | * | 5/1974 | Szoke | 359/336 |
| 5,461,507 A | * | 10/1995 | Westland et al. | 359/289 |
| 5,909,303 A | * | 6/1999 | Trezza et al. | 359/248 |

FOREIGN PATENT DOCUMENTS

| EP | 0460766 A2 | 12/1991 |
| GB | 2197495 A | 5/1988 |

* cited by examiner

*Primary Examiner* — Stephone B Allen
*Assistant Examiner* — Jade R Chwasz
(74) *Attorney, Agent, or Firm* — Coats & Bennett P.L.L.C.

(57) ABSTRACT

An optical logic device has a first mirror confronting a second mirror, and a saturable absorber located between the mirrors. Radiation that is output from the device is output via the first mirror. The reflectivity of the first mirror is such that, in use, for incident radiation which has an intensity that is above a given value, the intensity of exiting radiation is below a threshold. For incident radiation that is below the given value, the intensity of exiting radiation is above the threshold.

10 Claims, 11 Drawing Sheets

OPTICAL LOGIC DEVICE FOR PROCESSING OPTICAL SIGNALS

RELATED APPLICATIONS

This application claims priority from the foreign application having serial number PCT/EP2007/057922 and entitled "Optical Logic Device." That application was filed on Jul. 31, 2007, and is incorporated herein by reference in its entirety.

TECHNICAL FIELD

The present invention relates to optical logic devices.

BACKGROUND

Logical operations performed in the optical domain are required to enable ultra-fast all-optical signal processing (AOSP) for next generation all-optical networks. All-optical logic gates can be used to perform many functions for AOSP for packet-switched network applications. These functions include header recognition and/or modification, packet contention, data encoding, realization of half- and full-adders, etc. Semiconductor devices offer the advantage of compact size, low operating power, and relatively high speed.

Up to now, a number of schemes have been proposed to implement different all-optical logical gates exploiting nonlinear effects in optical media. For instance, different logical operators have been implemented in the optical domain exploiting Semiconductor Optical Amplifiers (SOAs). This can be seen in a variety of articles such as "All-Optical Multiple Logic Gates With XOR, NOR, OR, and NAND Functions Using Parallel SOA-MZI Structures: Theory and Experiment" by J. Y Kim et. al., in J. Lightw. Technol., Vol. 24, no 9, September 2006; "An All-Optical XOR Logic Gate for High-Speed RZ-DPSK Signals by FWM in Semiconductor Optical Amplifier" by N. Deng et. al., in J. Sel. Topics. Quant. Electron. Vol. 12, no. 4, July/August 2006; and "All-optical NAND gate using cross-gain modulation in semiconductor optical amplifiers" by S. H. Kim et. al., in Electron. Lett., vol. 41, no. 18, September 2001, all of which are incorporated herein in by reference in their entirety.

Beside SOAs, passive devices are attractive since they are cheaper and do not usually need external circuitry for current sinking and thermal stabilization. Passive saturable absorbers (SAs) comprised of semiconductor multiple Quantum wells (MQWs) have been widely exploited to perform ultra-fast AND operation. This can be seen, for example, in "1 Tbit/s demultiplexing using low temperature grown InGaAs/InAlAs multiple quantum wells" by H. Kobayashi in Electr. Lett. Vol. 34, pp. 908-909, April 1998, which is incorporated herein by reference in its entirety.

Logical operations for AOSP in Microring Resonators (MRs) have been also theoretically and experimentally investigated. This is seen in the articles entitled "40-Gb/s NRZ and RZ Operation of an All-Optical AND Logic Gate Based on a Passive InGaAsP/InP Microring Resonator" by S. Mikroulis in J. Lightw. Technol., vol. 24 no. 3, March 2006; and "All-Optical AND/NAND Logic Gates Using Semiconductor Microresonators by T. A. Ibrahim" et. al. in Photon. Technol. Lett., vol. 15, no 10, October 2003. Both of these references are incorporated herein by reference in their entirety.

Implementation based on SOAs are usually power-consuming and intrinsically noisy, and their cascadability is limited by the amplifier noise figure. Furthermore, in many cases they need careful polarization alignment of the input signals. On the other hand, the nonlinear characteristic of a passive SA, exhibiting low transmittance at low input energy and high transmittance at high input power is suitable to perform only AND operation between incident optical signals. Implementation of microring resonator devices is limited by technological issues that make this solution at the moment still costly and poorly reliable.

SUMMARY

According to a first aspect of the invention there is provided an optical logic device as claimed in claim 1.

One embodiment of the invention may be viewed as an optical device which uses saturable absorption in semiconductor Multiple Quantum Wells embedded in an asymmetric Fabry-Perot cavity, designed to perform NAND and NOR logical operations. The device works in reflection, i.e. the output light is collected from the same side as the input light. By properly designing the cavity parameters, the device can exhibit an inverse saturable absorber behavior, i.e. high reflectivity at low input energy and low reflectivity at high input energy level. The device is passive, compact, and polarization independent.

According to another aspect of the invention there is provided a method of processing optical signals using the device of the first aspect of the invention.

BRIEF DESCRIPTION OF THE DRAWINGS

Various embodiments of the invention will now be described, by way of example only, with reference to the accompanying drawings in which.

DESCRIPTION

Figure 1:
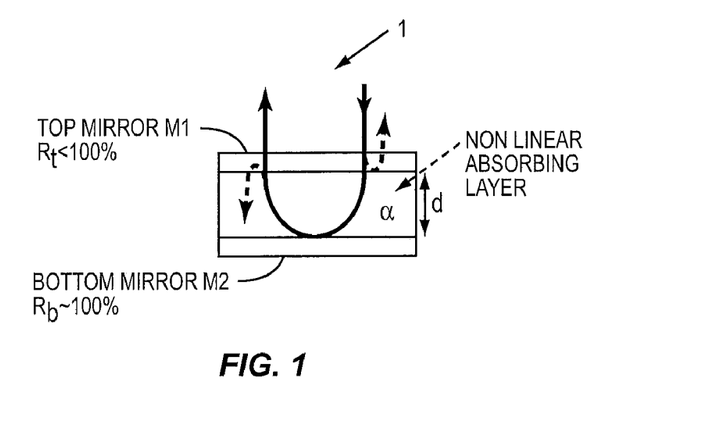
FIG. 1 illustrates a schematic cross-sectional view of an optical logic device.

FIG. 1 shows a vertical-cavity semiconductor gate (VCSG) device 1 comprising an asymmetric Fabry-Perot cavity or etalon which is formed between a bottom semiconductor mirror M2, whose reflectivity $R_b$ approaches 100%, and a top mirror M1 with a reflectivity $R_t$. The top mirror reflectivity $R_t$ is lower than 100%. Each mirror can be implemented with multiple alternating layers of two different semiconductor or dielectric materials, or, in the case of the highly reflective bottom mirror, with a thin layer of metallic material (e.g. silver, or gold). Saturable losses in the cavity are provided by semiconductor Multiple Quantum Wells (MQWs). Alternatively, other media exhibiting optically saturable losses can be exploited, like quantum-dots saturable absorbers or carbon-nanotube saturable absorbers, for example. The nonlinear cavity exhibits a minimum of the reflectivity at each Fabry-Perot cavity resonant wavelength. Henceforward resonant wavelength will be considered as the optimal working condition. At the resonant wavelength the VCSG reflectivity is given by "Design and operation of antiresonant Fabry-Perot saturable semiconductor absorbers for mode-locked solid-state lasers," by L. Brovelli et. al., in J. Opt. Soc. Am. B 12, 311-(1995), which is incorporated herein by reference.

$$R = \frac{|\sqrt{R_t} - \sqrt{R_b}\exp(-\alpha \cdot d)|^2}{(1-\sqrt{R_t R_b}\exp(-\alpha \cdot d))^2} \quad (1)$$

where d[m] is the length of the absorbing layer, and $\alpha$[m$^{-1}$] is the single-pass intensity absorption coefficient, which incorporates both saturable and non-saturable absorption contributions. Here, the saturable part of absorption is the energy-dependent part of absorption, which is caused by the band-filling effect in the MQWs, and can be expressed as:

$$\alpha_{sat} = \frac{\alpha_0}{1+E/E_{sat}} \quad (2)$$

with $\alpha_0$ [m$^{-1}$] being the unsaturated MQWs absorption coefficient, and $E_{sat}$ the MQWs absorption saturation energy. On the other hand, the non-saturable part of absorption $\alpha_{ns}$ [m$^{-1}$] does not change with incident energy (or intensity) and is due to fixed losses in the absorbing material. Thus, the total absorption coefficient can be expressed in the usual notation:

$$\alpha = \alpha_{ns} + \alpha_{sat} = \alpha_{ns} + \frac{\alpha_0}{1+E/E_{sat}} \quad (3)$$

Using eq. (1), we can see that the device reflectivity is zero if $$R_t = R_b \exp(-2\alpha d) \quad (4)$$

where the quantity $\exp(-2\alpha d)$ is the round trip power transmission through the absorber structure. The condition expressed by eq. (4) is usually called impedance-matching (IM). The internal roundtrip losses depend on the input energy via the nonlinear absorption coefficient $\alpha$, as expressed by eq. (3). Thus, for a given $R_t$, IM condition is satisfied for a particular value of the signal energy. By substituting (2) into (3), the energy-dependent impedance-matching condition becomes:

$$R_t = R_b \exp-2[\alpha_{ns}d + \alpha_0 d/(1+E/E_{sat})d] \quad (5)$$

Figure 2:
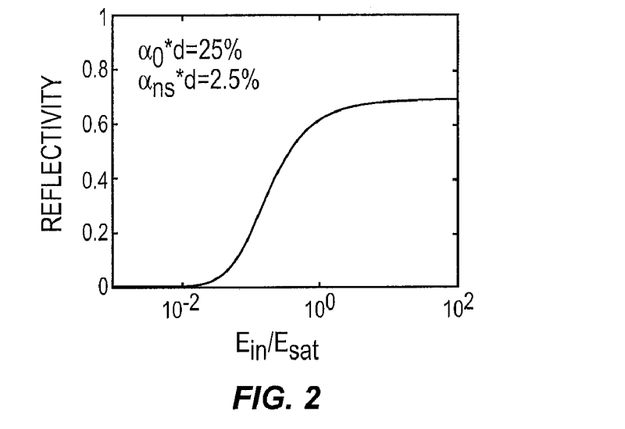
FIG. 2 illustrates a graphical representation of the reflectivity characteristic vs. normalized input energy for the device of FIG. 1, which is designed to meet an impedance matching condition at low input energies.

When the top mirror reflectivity $R_t$ satisfies the condition:

$$R_t = R_b \exp-2[(\alpha_{ns}+\alpha_0)d] \quad (6)$$

the IM-condition is satisfied at low input energy ($E \ll E_{sat}$), as can be seen from eq. (5). This the optimal condition for having an all-optical AND gate, in which the resonator enhances the typical SA characteristic. In this case indeed, the VCSG reflectivity (which is a measure of the intensity of the light exiting the device via the top mirror M1, and is defined as the ratio of the exiting intensity and the entering intensity) is low (ideally zero) for low input powers, and high for high input powers. A typical characteristic of the VCSG reflectivity vs. normalized input energy is shown in FIG. 2, obtained from numerical simulations.

On the other hand, if the top mirror reflectivity $R_t$ satisfies the condition:

$$R_t = R_b \exp(-2\alpha_{ns}d) \quad (7)$$

the minimum of reflectivity (i.e. the impedance matching condition) is achieved at high input energy ($E \gg E_{sat}$), as can be easily verified from eq. (5). In this case the VCSG exhibits an inverse saturable absorber characteristic, as it is demonstrated in the following.

Assuming $R_b \cong 1$, under the condition expressed by eq. (6), at low input energies ($E \gg E_{sat}$) the VCSG reflectivity is given, from eq. (1):

$$R_{ON} = \frac{e^{-2\alpha_{ns}d}[1 - e^{-\alpha_0 d}]^2}{[1 - e^{-(2\alpha_{ns}+\alpha_0)d}]^2} \quad (8)$$

which expresses the high-reflectivity (ON) state of the gate. The value of $R_{ON}$ depends on the values of $\alpha_0$ and $\alpha_{ns}$. For high levels of the input power ($E \gg E_{sat}$), the saturable part of the absorption is completely bleached (i.e. $\alpha_{sat} \sim 0$, there are substantially no saturable losses left as an effect of the high incident energy), and the absorption coefficient given by eq. (3) becomes:

$$\alpha = \alpha_{ns} \quad (9)$$

Under the condition expressed by eq. (7), we have that the reflectivity of the VCSG, given by eq. (1) and assuming $R_b = 1$, drops to $R_{Off} = 0$, since the device is now impedance-matched.

Figure 3:
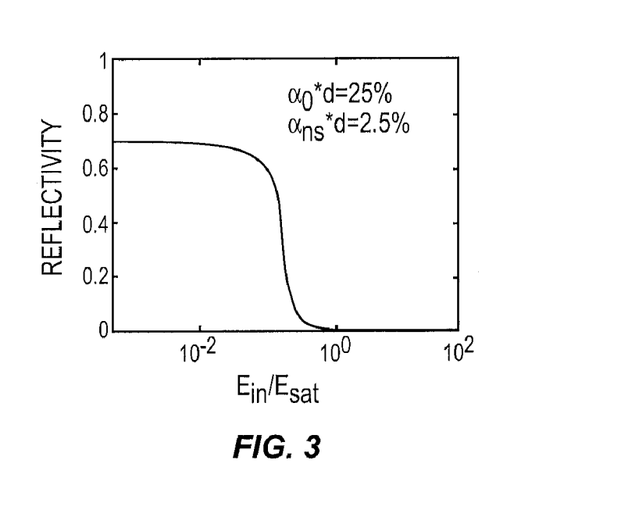
FIG. 3 illustrates a graphical representation of the reflectivity characteristic vs. normalized input energy for the device of FIG. 1, which is designed to meet impedance matching condition at high input energies.

Results of numerical simulation for the case of a VCSG designed to meet impedance matching condition at high input energies are shown in FIG. 3.

Thus, by matching the impedance of the VCSG (hence cancelling the reflected field) when the saturable part of absorption is completely bleached, it is possible to reverse the AND characteristic of a standard saturable absorber. This feature allows the implementation of NOR/NAND logical gates, as explained in more detail below. This functionality can be achieved by carefully selecting the reflectivity of the top mirror M1. From eq. (6) and eq. (7), it can be seen that the condition for having a NAND/NOR gate corresponds to a higher top mirror reflectivity $R_t$ with respect to the case of an AND gate.

Optimizing Design

As seen from above, by matching the impedance of the VCSG (hence cancelling the reflected field) when the saturable part of absorption is completely bleached, it is possible to reverse the AND characteristic of a standard SA.

However, in order to implement effective logical operations a step-like transition, with a reduced dynamic range required for switching the gate between the ON and the OFF states, is desirable. In order to obtain a steep transition of the inverse saturable absorber characteristic, the internal field enhancement effect inside the resonator can be exploited, which is related to the cavity finesse. The higher the cavity finesse, the higher the field enhancement factor. Since the cavity finesse also varies dynamically according to the power-dependent value of the absorption coefficient, it is important to have a finesse which is as much as possible increasing during the transition. At resonance, intensity distribution inside the structure can be much higher (or lower) than the input energy, depending on working conditions. The ratio between the energy inside the cavity and the energy incident on it at the resonant wavelength is given by "Design and operation of antiresonant Fabry-Perot saturable semiconductor absorbers for mode-locked solid-state lasers," by L. Brovelli et. al., in J. Opt. Soc. Am. B 12, 311-(1995).

$$\psi = \frac{(1 - R_t)}{\left(1 - \sqrt{R_t R_b} \exp(-\alpha d)\right)^2} = \frac{\mathcal{F}^2 \left[1 - \sqrt{R_t R_b} \exp(-\alpha d)\right](1 - R_t)}{\pi^2 \sqrt{R_t R_b} \exp(-\alpha d)} \quad (10)$$

Being $\mathcal{F}$, the resonator finesse, is defined as:

$$\mathcal{F} = \frac{\pi \left[\sqrt{R_t R_b} \exp(-\alpha d)\right]^{1/2}}{1 - \sqrt{R_t R_b} \exp(-\alpha d)} \quad (11)$$

It is well known that the finesse of a Fabry-Perot resonator increases if the losses inside the cavity decrease. Since the absorption coefficient is always decreasing for increasing power, the finesse increases monotonically for increasing input energy, which is good for further pushing the absorber in the saturation regime. Indeed in this way, once the absorption is bleached above a certain value, the internal field increases, and this helps to bring the absorption to the final state more rapidly. Large changes of $\Psi$ for small changes of the input energy can make possible to realize steep transition from ON-to-OFF state. Thus, the finesse should exhibit a steep increase for $\alpha$ approaching $\alpha_{ns}$. For $E \gg E_{sat}$, we have:

$$\psi_{E \to \infty} = \frac{(1 - R_t)}{\left(1 - \sqrt{R_t R_b} \exp(-\alpha_{ns}d)\right)^2} \quad (12)$$

If the top mirror is optimized for impedance matching at high powers ($\alpha_{E \to \infty} = \alpha_{ns}$), then the previous expression can be rewritten as:

$$\psi_{E \to \infty}^{IM} = \frac{(1 - R_b \exp(-2\alpha_{ns}d))}{(1 - R_b \exp(-2\alpha_{ns}d))^2} = \frac{1}{(1 - R_b \exp(-2\alpha_{ns}d))} \quad (13)$$

Figure 4:
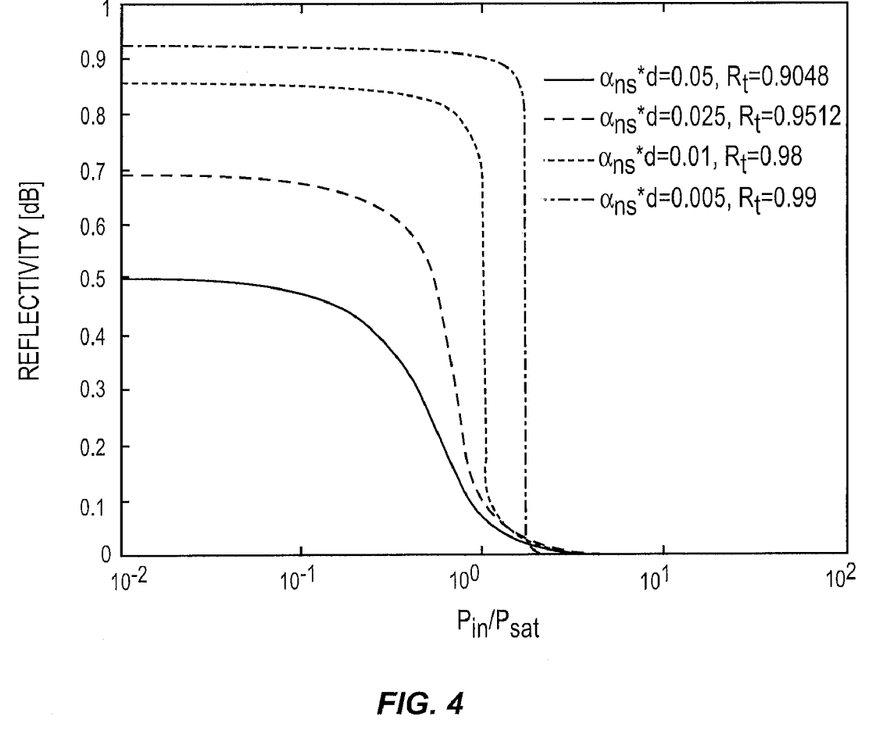
FIG. 4 illustrates the nonlinear reflectivity characteristic of the device of FIG. 1 exhibiting inverse saturable behaviour, in which different values of round-trip non-saturable losses $\alpha_{ns}*d$ are considered.

And it can be seen that for $R_b = 1$ and $\alpha_{ns} \to 0$ then $\Psi \to \infty$. Hence, small values of $\alpha_{ns}$ are good to have a high value of the internal field enhancement factor when the absorber is completely (or partially) saturated. This decreases the dynamic input energy range for which the gate changes its operating state, allowing a steep characteristic of gate reflectivity as a function of the input energy. FIG. 4 illustrates the effect of decreasing $\alpha_{ns}$ (for a fixed value of $\alpha_{ns}$) on the nonlinear reflectivity characteristic of the VCSG. The results showing the nonlinear VCSG reflectivity at a cavity resonance as a function of input energy of a signal tuned at the resonant wavelength. Bottom mirror reflectivity $R_b$ is assumed to be 100%.

Design of NOR/NAND Logical Operators with VCSG

Up to now, the incident field tuned at one of the resonances of the VCSG has been considered. However, if it is desired to use the VCSG for NOR and NAND logical operations, a pump-probe configuration is required. In particular, two pump beams representing the two logical inputs would affect the probe signal state at the VCSG output, providing the result of the logical operations between two input pump bits. In principle both the pump signals and the probe signal could be tuned at two different resonances of the nonlinear cavity. In this case the efficiency of the operation would be increased up to its maximum value. In practice, it is sufficient and also desirable that only the probe signal is tuned at a Fabry-Perot resonance, while the two pumps could be tuned away from the probe wavelength. This would increase wavelength transparency of the device with respect to external input pump signals, while a local probe signal wavelength is kept close to a VCSG resonance.

Figure 5:
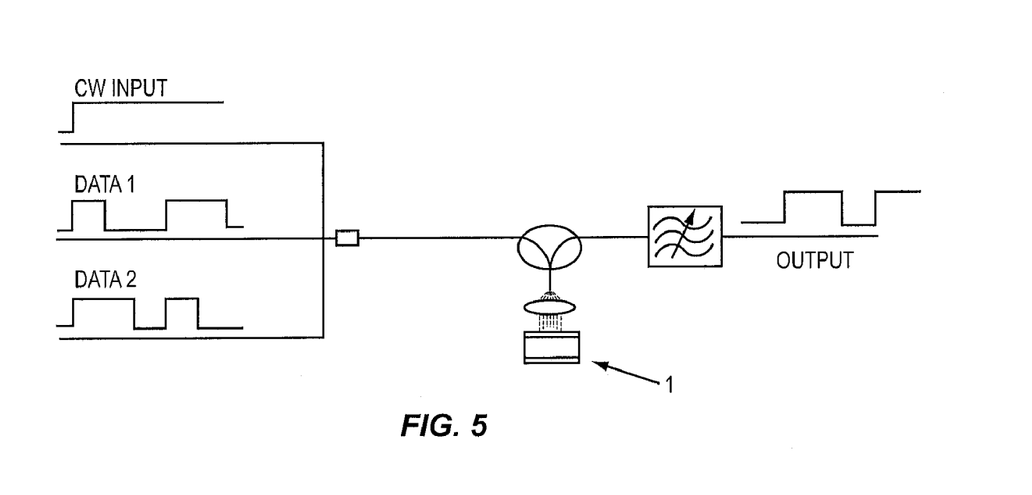
FIG. 5 illustrates a schematic representation of an optical signal processing arrangement comprising the device of FIG. 1.

Thus, in order to implement NAND/NOR functions in a pump-probe configuration, a spectral analysis of the gate is required. This can be easily done by considering the general expressions for the reflectivity of the VCSG and the internal field enhancement factor that, for an input signal matching a cavity resonance are given by eq. (1) and (6). By taking into account the round-trip phase in the resonator associated with any input wavelength eqs. (1) and (6) can be extended to:

$$R = \frac{\left[\sqrt{R_t} - \sqrt{R_b}\exp(-\alpha d)\right]^2 + 4R_tR_b\exp(-\alpha d)\cos^2(\phi/2)}{\left[1 - \sqrt{R_t}\sqrt{R_b}\exp(-\alpha d)\right]^2 + 4R_tR_b\exp(-\alpha d)\cos^2(\phi/2)} \quad (14)$$

$$\Psi = \frac{1 - R_t}{\left[1 - \sqrt{R_t}\sqrt{R_b}\exp(-\alpha d)\right]^2 + 4R_tR_b\exp(-\alpha d)\cos^2(\phi/2)} \quad (15)$$

in which $\phi$ is the wavelength dependent single-pass dephasing. By using eqs (10) and (11) and the power dependence of a expressed by eq. (2) (with $E=\Psi E_{in}$, being $E_{in}$ the input energy) it is possible to calculate the reflectivity spectrum of the VCSG for different values of the input pump and probe energy. By means of the spectral model is possible then to calculate the effect of the pump power at a generic wavelength on the reflectivity experienced by a probe field tuned at the resonant wavelength. A signal processing apparatus, including the device 1, is shown in FIG. 5.

NAND Operation

Figure 6A:
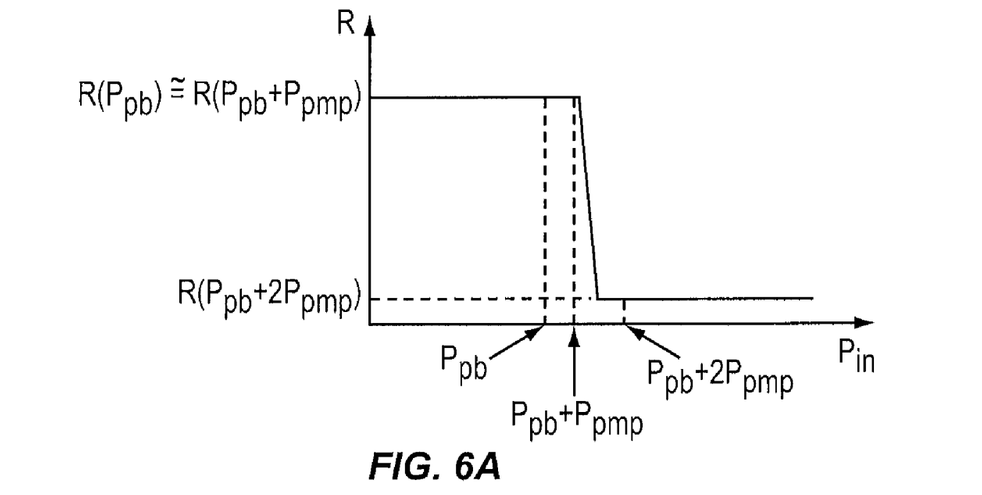
FIG. 6A illustrates a graphical representation of the reflectivity versus optical input power of the device of FIG. 1 functioning as a NAND gate.

A schematic representation of the operation principle of the NAND gate with the proposed VCSG is illustrated in FIG. 6A, showing the reflectivity experienced by the probe field at resonance as a function of total input power (probe and pump fields). Let us consider an ideal gate, with an almost step-like inverse SA reflectivity characteristic. A continuous probe field with power $P_{pb}$, close to the transition edge, is first applied to the gate, experiencing high reflectivity in absence of pump pulses, $R(P_{pb})$.

Figure 7A:
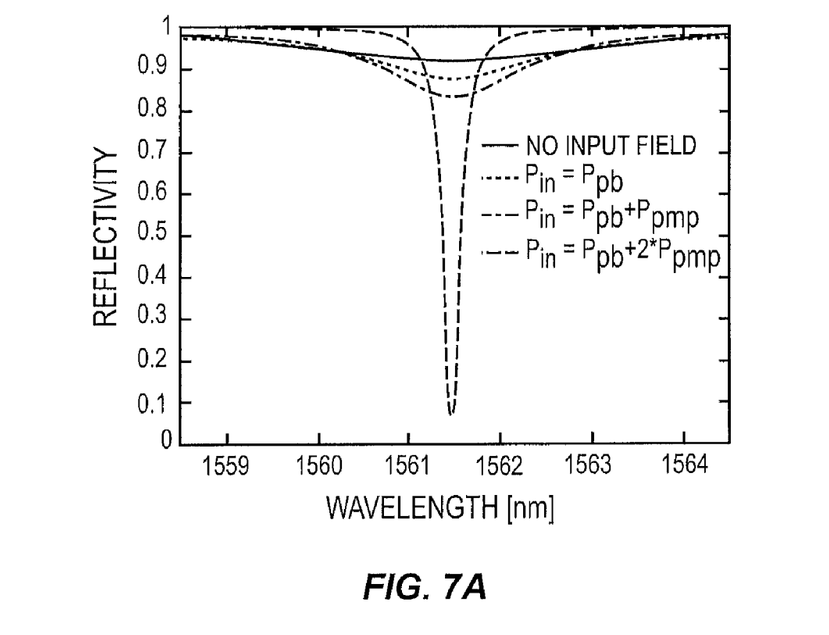
FIG. 7A illustrates a graphical representation of spectral reflectivity of the device of FIG. 1 under different input power conditions for a NAND operation.

The two pump signals are considered to be applied simultaneously to the device. The pump signal is comprised of logical "1" and "0" signals, where the pump power associated with each "1" data signal is $P_{pmp}$ and the pump power associated with a "0" data signal is zero. The value of both $P_{pb}$ and $P_{pmp}$ are chosen in such a way that a single pump "1" data signal is not enough to switch the gate in the OFF state (corresponding to low reflectivity for the probe light), while twice the power associated with a pump "1" signal is enough to switch the gate in the OFF state. Thus, the reflectivity $R(P_{pb}+P_{pmp})$ associated with the sum of probe power and a single pump bit is high. On the other hand $R(P_{pb}+2P_{pmp})$, corresponding to a total input power given by the sum of probe and two pump "1" data signals is low. The filtered output probe field represents hence a NAND operation between the two input pump pulse pulses. The calculated spectral reflectivity of the nonlinear gate under different input power conditions, are shown in FIG. 7A, for the case of NAND operation. The parameters value used in the simulations are: $\alpha_0 d=0.25$, $\alpha_{ns}d=0.005$ $P_{pb}=2.5*P_{sat}$, $P_{pmp}=1*P_{sat}$, and pump detuning from resonance $\Delta_{res}=1$ nm.

With opportune values of input probe and pump powers, it can be seen that with the reflectivity is always high when either the probe field or the probe and a single pump pulse are applied to the gate. On the other hand, if twice the pump power is applied to the gate the reflectivity at the resonant wavelength is drastically reduced. From FIG. 7A it can also be seen that the resonance width changes drastically between the low-finesse regime in the ON state and the OFF state associated to a high value of the resonator finesse. The bandwidth of the VCSG resonance in the OFF state is thus inversely proportional to the steepness of the nonlinear characteristic. Increasing the bandwidth would decrease the steepness of transition, leading to a reduced ON/OFF Extinction Ratio (ER). A trade-off between resonance bandwidth and ER has to be considered in designing the device. The simulation also revealed that in most cases ER greater than 10 dB can be obtained with resonance bandwidths wide enough to allow operation speeds exceeding tens of GHz.

NOR Operation

Figure 6B:
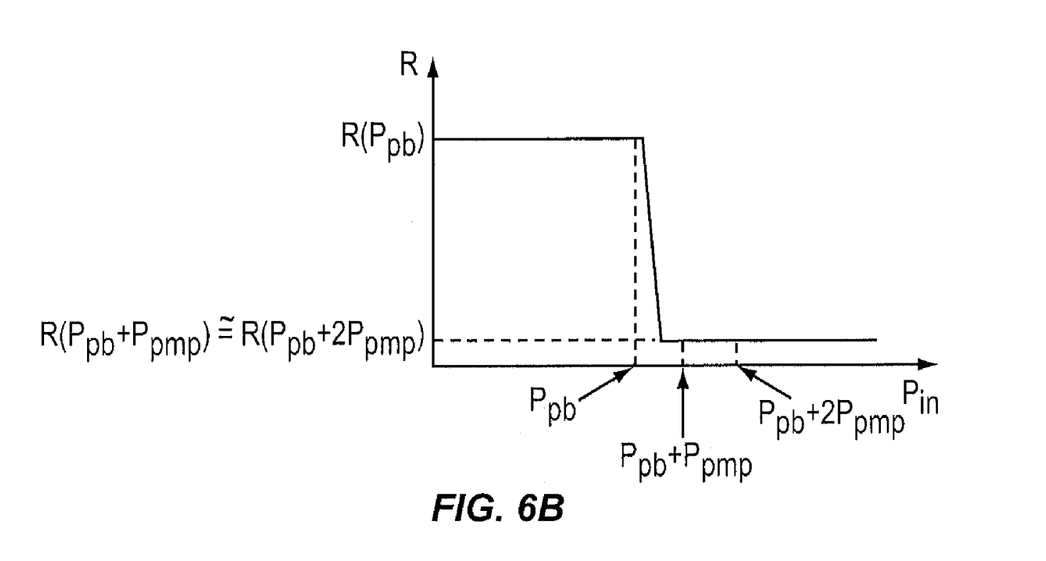
FIG. 6B illustrates a graphical representation of the reflectivity versus optical input power of the device of FIG. 1 functioning as a NOR gate.
Figure 7B:
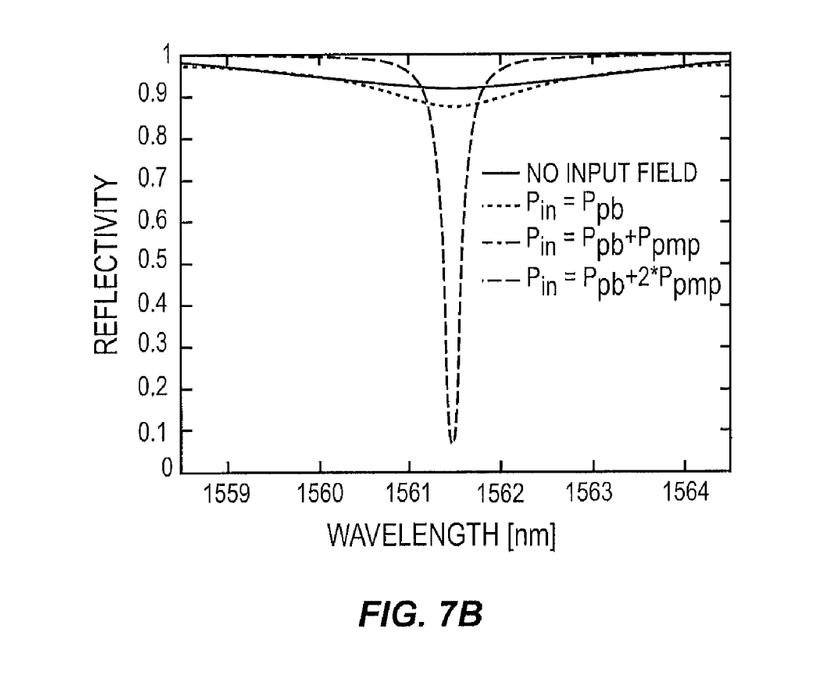
FIG. 7B illustrates a graphical representation of spectral reflectivity of the device of FIG. 1 under different input power conditions for a NOR operation

In a similar way NOR operation can be performed. In this case, with a probe field matching a cavity resonance and with a proper power value, if one single pump pulse contains enough energy to turn the gate in the OFF state at the resonant wavelength, NOR between the two pump pulses can be retrieved by filtering out the reflected probe power. The schematic of the operation and the calculated spectral reflectivity for this case are shown in FIG. 6B and FIG. 7B, respectively. The parameters used to calculate the spectral reflectivity are the same as in the case of FIG. 7A, with the exception of pump power, set to $P_{pmp}=2*P_{sat}$, in this case.

Thus, by properly setting the pump power (with an opportune biasing probe power level) the two operations can be obtained in the same device. In an alternative embodiment, the biasing probe power is changed while keeping constant the pump power to switch between the two logical operations of NAND and NOR.

Effect of Cavity Parameters

In this section the effects of cavity parameters on device operation are investigated. In particular, the effect of the saturable low-power absorption coefficient $\alpha_0$ and the non-saturable absorption coefficient, $\alpha_{ns}$, on the nonlinear cavity characteristic are analysed. The bottom mirror reflectivity was assumed to be 100%, and the top mirror reflectivity was set to the value satisfying condition (4). All the results are normalized to the absorber saturation power.

The figures of merit of the device are the ON/OFF contrast ratio, the dynamic energy range in which the transition take place, and the efficiency of the gate, i.e. the reflectivity value when the gate is in the ON state.

Since the device is intended to operate in a pump-probe operation, the nonlinear reflectivity at the resonant wavelength as induced by the probe field itself was first calculated. This simulation permitted the assessment of an appropriate value for the input probe power. In a second step, the reflectivity experienced by the probe field (always at resonance), with a suitable power level was calculated as a function of pump power, being pump light at a fixed detuning from resonance. The simulations were performed by means of the nonlinear spectral model introduced above.

Figure 8A:
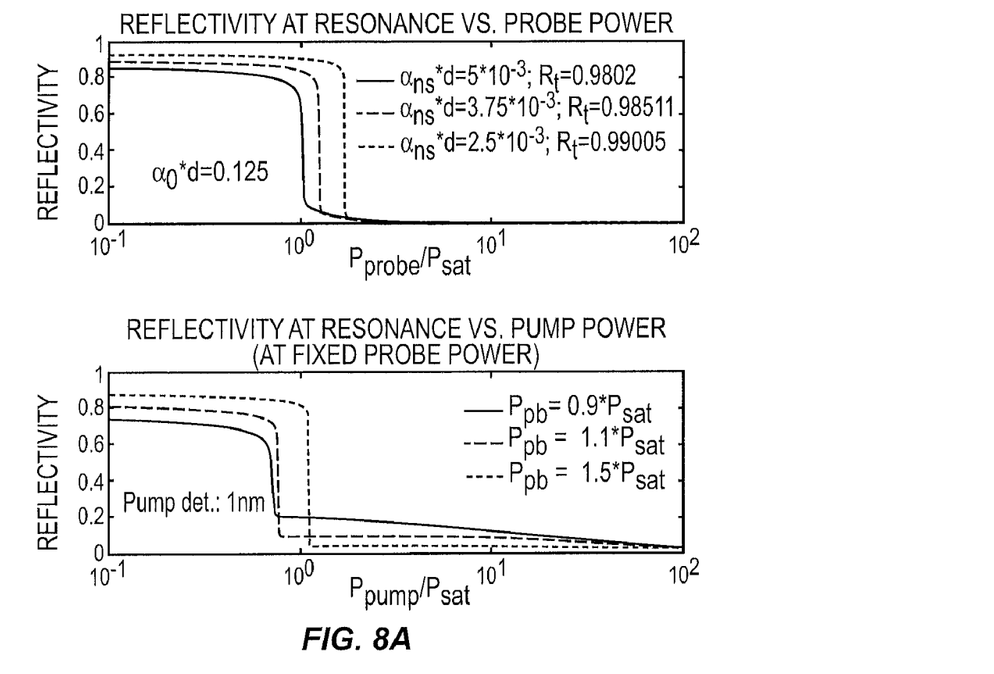
FIGS. 8A-8C illustrates three pairs of graphical representations of the reflectivity versus a ratio of an input power component and the saturation power.
Figure 8B:
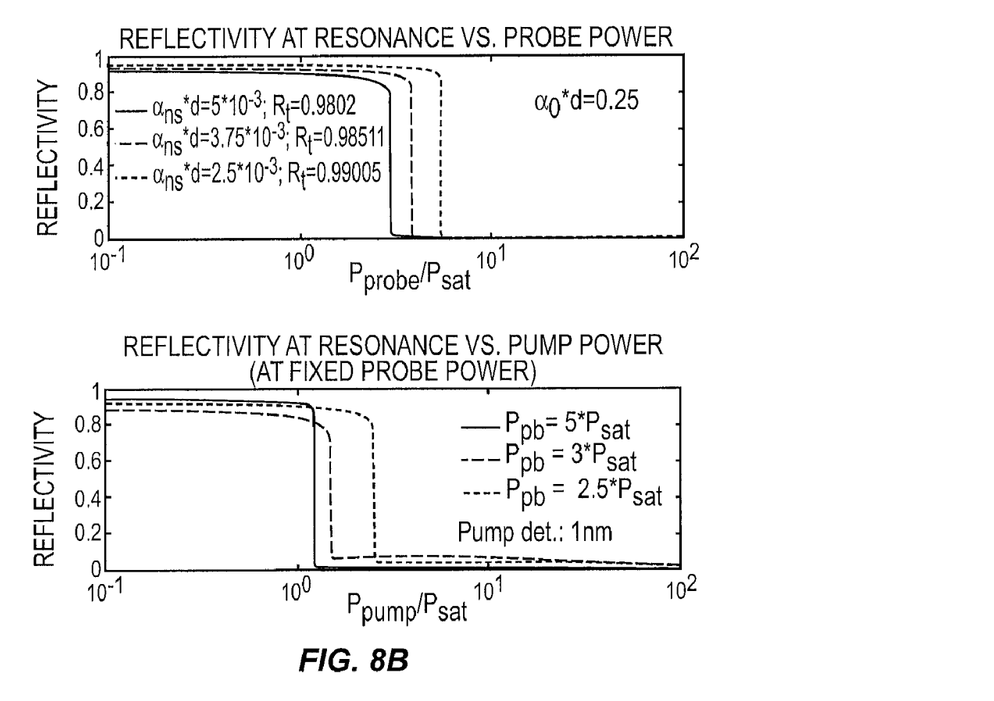
Figure 8C:
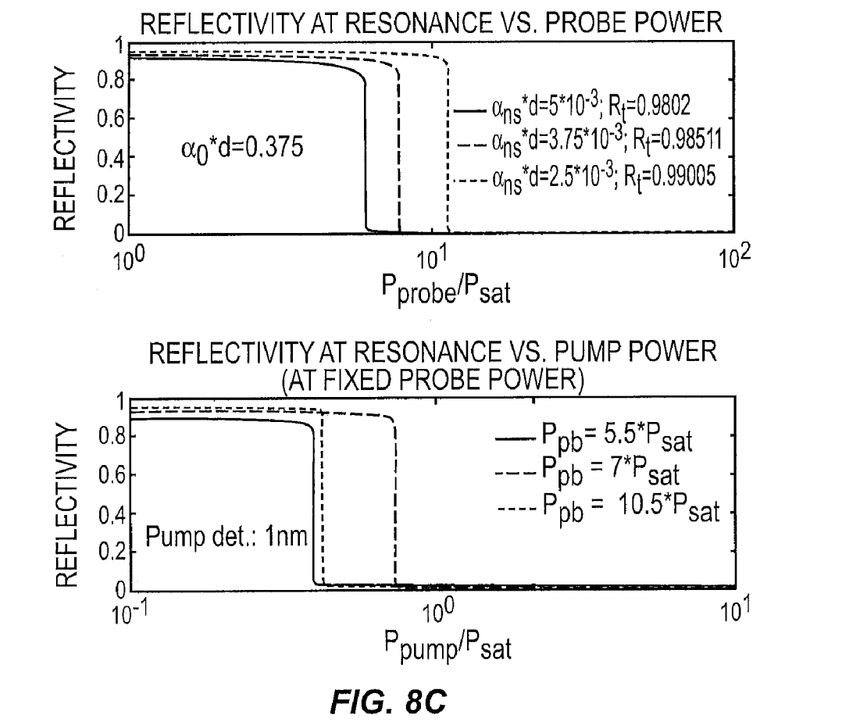

FIGS. 8A, 8B, and 8C show the results of the simulations. Each pair of figures represents the nonlinear reflectivity at resonance, induced by the probe (upper plots) and the pump field (lower plots), for a chosen value of probe power, obtained for three different values of $\alpha_{ns}d$, for a fixed value of $\alpha_0 d$. It can be seen from the Figures that the steepest characteristic of reflectivity at resonance vs. pump power can be obtained for the smallest value of $\alpha_{ns}d$. The reason for this, as explained above, lies in the steep increase in the resonator finesse as the losses are saturated beyond a certain value. Consequently, the probe field power inside the resonator is enhanced, which contributes to a deeper saturation of the absorber, leading to even higher value finesses and of the field enhancement factor at resonance. Under these conditions, it is the probe light itself that contributes to a fast switch of the gate from ON to OFF state, once the initial condition of high reflectivity is modified by external pump signals. In these operating conditions the role of the pump power can be seen to be the trigger of a regenerative process for the probe light at the resonant wavelength. However, in this particular situation optical bistability could appear. That is, when the pump field is switched off, the device could remain in the OFF state. Although it could be useful in other system applications, this is clearly a situation that should be avoided for this kind of application.

Returning to FIGS. 8A-8C it can be seen from the reflectivity-vs.-$P_{pmp}$ characteristic that complete transition from ON-to-OFF state, could be attained in a reduced dynamic range of input pump power. The smallest dynamic range occurs for the lowest values of $\alpha_{ns}d$. However, very small values of the non-saturable losses $\alpha_{ns}d$ also lead to unpractical values of top mirror reflectivity (>0.99). This could in principle prevent practical implementation of the device. Furthermore, as is discussed below, in this situation it is more likely to have bistability. Increasing the non-saturable losses $\alpha_{ns}d$ has a twofold detrimental effect. The non linear characteristic at resonance vs. pump power becomes smoother and the ON/OFF contrast ratio is degraded. Also these behaviours can be explained within Fabry-Perot theory. If the saturable part of the losses ($\alpha_0 d$, in the slide legend) is decreased, the detrimental effects of non negligible $\alpha_{ns}$ is even worse. On the other hand, increasing $\alpha_0 d$ leads to good extinction ratio values even in presence of moderate values of $\alpha_{ns}d$. However, very high values of $\alpha_0 d$ are difficult to obtain in practice, lead to high values of saturation power (hence preventing low-power operation) and usually came along with higher values of $\alpha_{ns}$. A trade-off for device performance for practical implementation should hence be considered.

Bistability Analysis

Here, bistability operation of the device is investigated, together with conditions for avoiding bistability. The analysis of bistability can be made by using a procedure similar to that of "Criteria for optical bistability in a lossy saturating Fabry-Perot" by E. Garmire in J. Quant. Electron., vol. 25, no. 3, March 1989, which is incorporated herein by reference in its entirety., in which the nonlinear effect was only associated to refractive index change, rather than absorption. Here we neglect the nonlinear index change (assumed to be small with respect to large absorption changes), while considering only the effects of saturation of absorption. The analysis could be easily extended to the generic case in which both nonlinear index and absorption change are taken into account. Bistability behavior can be seen by writing both the input and reflected intensities ($I_{in}$ and $I_{ref}$ respectively) as a function of the field intensity inside the cavity $I_c$, and then plotting $I_{ref}$ against $I_{in}$, ignoring the variable $I_c$. We have:

$$I_{in} = I_c \frac{\left(1 - \sqrt{R_t}\sqrt{R_b}\, e^{-\left(\frac{\alpha_0}{1+Ic/I_s}+\alpha_{ns}\right)d}\right)^2}{(1-R_t)} \quad (16)$$

$$I_r = I_c \frac{\left(\sqrt{R_t} - \sqrt{R_b}\, e^{-\left(\frac{\alpha_0}{1+Ic/I_s}+\alpha_{ns}\right)d}\right)^2}{(1-R_t)} \quad (17)$$

Figure 9:
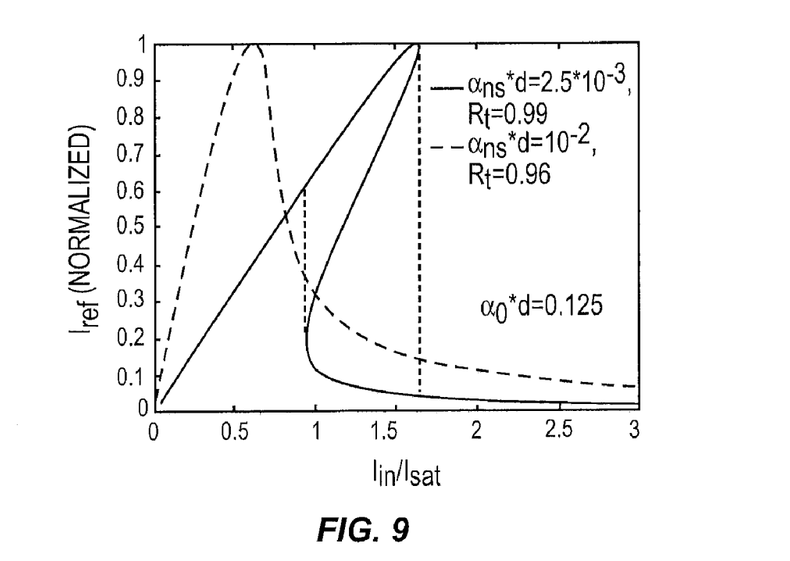
FIG. 9 illustrates a graphical representation illustrating intensity characteristics (output intensity versus input intensity) for bistable and non-bistable behaviors of the device of FIG. 1.

FIG. 9 shows the input light-reflected light characteristic at resonance for different values of $\alpha_{ns}d$ and fixed $\alpha_0 d$. It can be seen that in the case of higher finesse at high input energy (lower $\alpha_{ns}d$), the device exhibits a bistable behaviour. From above it was shown that the condition of high finesse for high input energy leads to the steepest possible transition between ON and OFF state. However, bistability sets a limit to the ideal minimum value of internal non-saturable losses. In fact, if the bistability conditions are met, depending on the input probe biasing power, once the pump signal is switched off the device could remain in the OFF state rather than going back to its initial ON state. This is also confirmed by dynamic simulations presented below. In designing the cavity, the condition for bistability setting should be avoided. This could be made basically in two ways. The first one is to design a cavity which is inherently non-bistable. The second one is to bias the gate with a proper value of input probe power that lies outside the histeresis region comprised between the dashed lines of FIG. 9. Both these methods show some drawback in terms of the ON/OFF extinction ratio degradation. These effects are discussed, together with some possible mitigating solutions below, when presenting the results of numerical simulations relative to dynamic behaviour of the VCSG.

Dynamic Operation

The dynamic operation of the VCSG can be investigated by inserting in eq. (1) the equation governing the dynamic variation of absorption in the MQWs. By using a single-time constant model for the absorbing section we can write for the absorbing coefficient inside the cavity:

$$\frac{d\alpha}{dt} = \frac{\alpha_0 - \alpha}{\tau_s} - \frac{(1-R_t)\cdot P_{pb}\cdot \alpha}{E_{sat}\left(1+\sqrt{R_t}\cdot\sqrt{R_b}\, e^{-(\alpha+\alpha_{ns})d}\right)^2 - 4\sqrt{R_t}\cdot\sqrt{R_b}\, e^{-(\alpha+\alpha_{ns})d}\cos^2(\phi_{pb}/2)} \quad (18)$$

$$- \frac{(1-R_t)\cdot P_{pmp}\cdot\alpha}{E_{sat}\left(1+\sqrt{R_t}\cdot\sqrt{R_b}\cdot e^{-(\alpha+\alpha_{ns})d}\right)^2 - 4\sqrt{R_t}\cdot\sqrt{R_b}\, e^{-(\alpha+\alpha_{ns})d}\cos^2(\phi_{pmp}/2)}$$

where $P_{pb}$ and $P_{pmp}$ are the usual probe and pump input powers, respectively, and $\phi_{pb}$ and $\phi_{pmp}$ are the round-trip phases associated with probe and pump wavelength, respectively, and $\tau_s$ is the carrier recombination time in the MQWs. In the following a value of $\tau_s=5$ ps was assumed. This value can be typically reached in semiconductor MQWs by using standard techniques for speeding up recombination time in semiconductor materials, like for instance ion implantation as described by P. W. Smith et. al., in "Mode locking of semiconductor diode lasers using saturable excitonic nonlinearities," published in J. Opt. Soc. Amer. B, Opt. Phys., vol. 2, no. 7, pp. 1228-1236, July 1985, or of low-temperature molecular beam epitaxy as described by R. Takahashi et. al. in "Ultrafast 1.55 μm photoresponses in low-temperature-grown InGaAs/InAlAs quantum wells," published in Appl. Phys. Lett., vol. 65, no. 14, pp. 1790-1792, October 1994. Both of these documents are incorporated herein by reference in their entirety.

NAND Operation

Figure 10A:
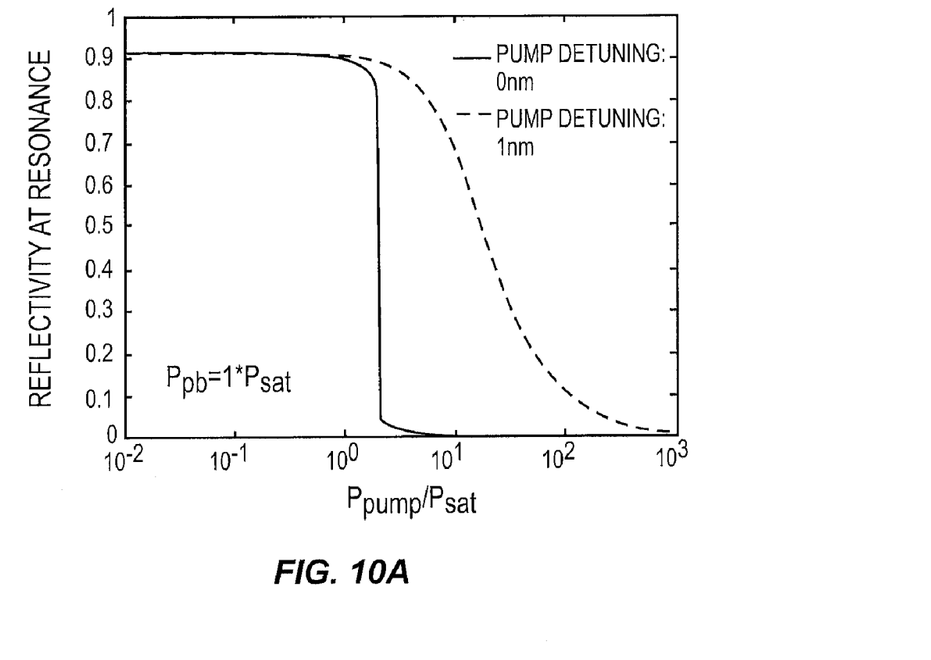
FIG. 10A illustrates two graphical representations of the effect of pump detuning on the induced reflectivity at resonance, for the device of FIG. 1 with a moderate value of high-energy finesse ($\alpha_{ns}d=0.005$), and moderate biasing probe field ($P_{pb}=P_{sat}$), the value of $\alpha_0 d$ being 0.25.
Figure 10B:
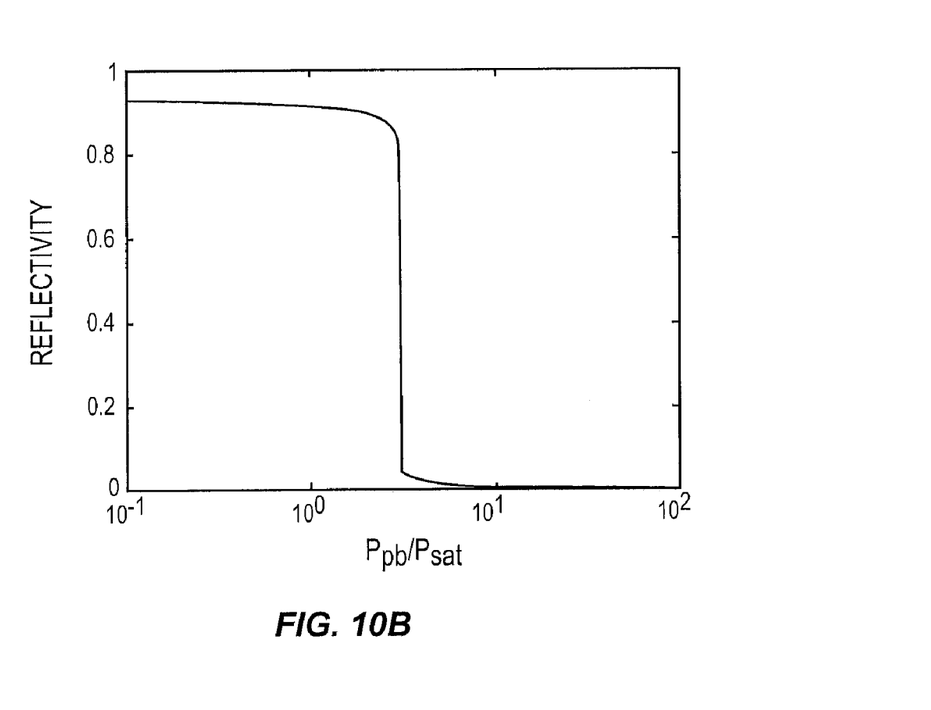
FIG. 10B shows a graphical representation of reflectivity-vs-probe power characteristic (in absence of pump field).
Figure 11A:
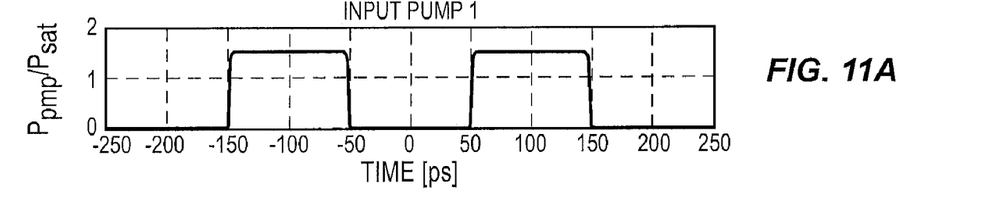
FIGS. 11A-11C illustrate three graphical representations of the two input pump signals and the output signal for dynamic NAND operation of the device of FIG. 1 in the case of FIG. 10A (solid line).
Figure 11B:
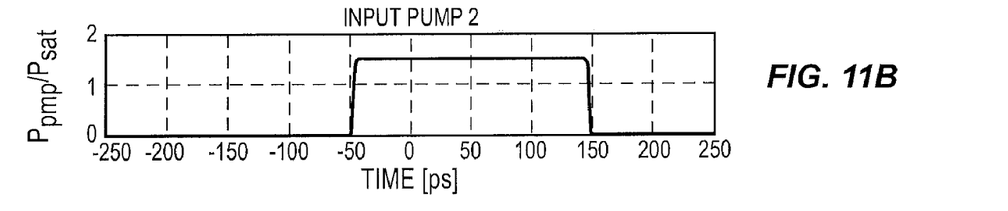
Figure 11C:
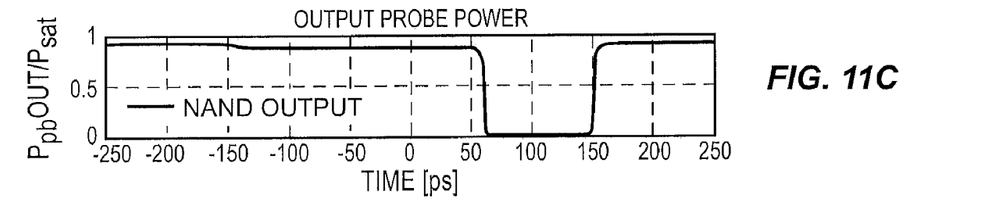
Figure 12A:
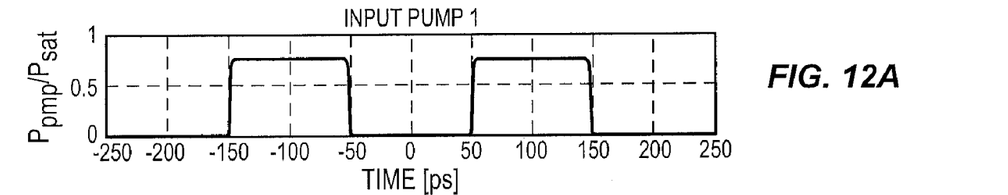
FIGS. 12A-12C illustrate three graphical representations of the two input pump signals and the output signal for the dynamic NAND operation of the device of FIG. 1 with the same parameters as FIG. 10A (solid line), but with increased biasing probe power $P_{pb}=2*P_{sat}$.
Figure 12B:
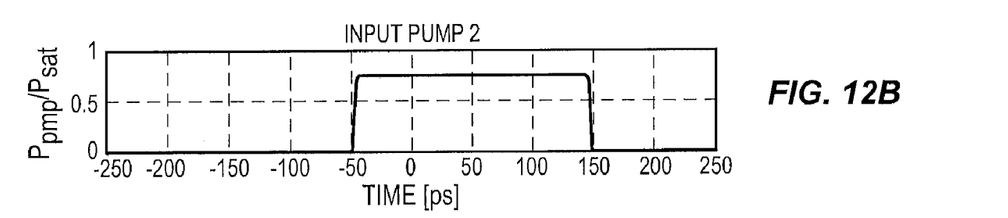
Figure 12C:
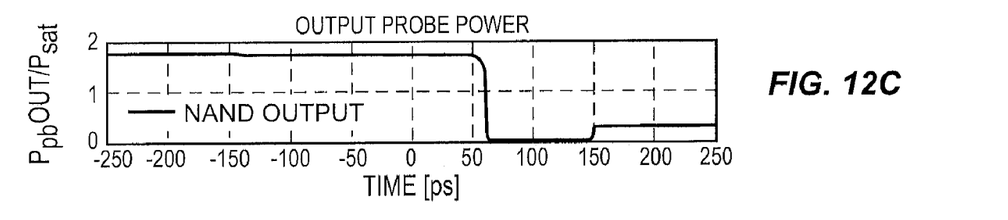

As noted above, in order to allow recovery of the gate to its initial state, condition for hysteresis in the cavity should be avoided. This could be made by limiting the finesse value at high energies, by choosing a value for $\alpha_{ns}$ sufficiently large, or by setting the biasing probe power lying outside the histeresis bounding region. Of course, the two solutions can be also combined. However, both these solutions infer the quality of the output signal. Indeed, increasing the value of $\alpha_{ns}$, smoothes the On/Off transition at the resonant wavelength, as illustrated in FIG. 10A. The curve becomes even smoother if we consider the reflectivity change of the probe field that is induced by a pump field away from resonance (see, for example FIG. 8C, lower plot, solid line). This degradation could eventually prevent the operation of the NAND gate, in which a strong reflectivity change is required within 3-dB of input pump dynamic range. A possible solution would be in this case to tune also the pump field in proximity of a cavity resonance. In this case the steepness of transition can be preserved, provided that $\alpha_{ns}$ is not too large and NAND operation can still be possible. An example of this situation is shown in FIG. 10A, where the reflectivity of the probe field induced by the pump field for the two cases of a pump far (dashed line) and near (solid line) a second cavity resonance are shown, respectively, with $\alpha_{ns}d=5^{-3}$, and $\alpha_0 d=0.25$. In this case the probe biasing power is also chosen to be $P_{pb}=P_{sat}$, not too close to the transition edge of the reflectivity-vs.-probe power characteristic (shown in FIG. 10B). The dynamic behavior, obtained using the model given eqs. (14) and (1) is also shown in FIGS. 11A-11C. For comparison, FIGS. 12A-12C illustrate the dynamic behavior in the case of bistable operation. In this case the probe power is increased up to $2*P_{sat}$, and it can be seen from the lowermost graph (FIG. 12C) that in this case the output probe power remains low even after the pump pulses have been switched off. The condition of having a pump field close to the cavity resonance may not be desirable, since it would limit the transparency of the operation to external pumps wavelength, unless a wavelength converting stage would be inserted at device input.

To allow tolerance to pump detuning from resonance, and avoid hysteresis, it is then possible to choose low values of $\alpha_{ns}d$ and set the bias power not too close to the transition edge. If the reflectivity of the probe induced by the pump power in this case is considered, the degradation of the characteristic is again observed.

Figure 13:
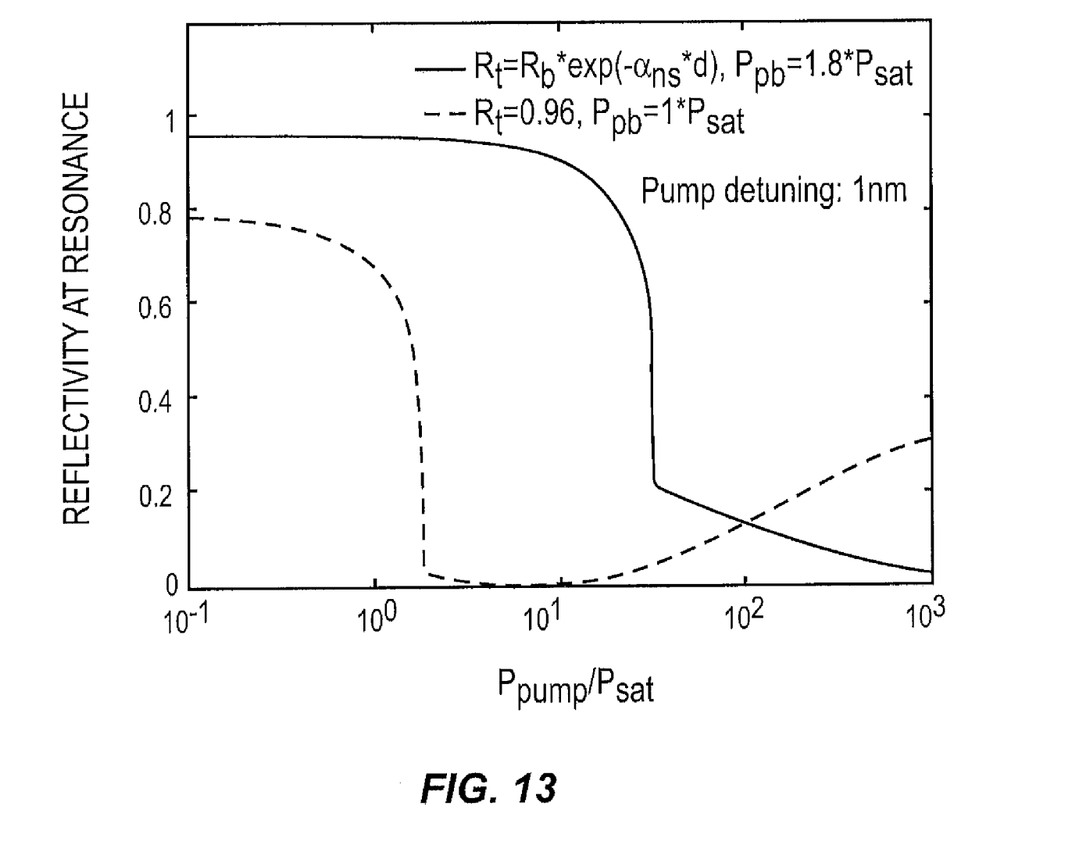
FIG. 13 illustrates a graphical representation of induced reflectivity at resonance by a pump field tuned 1 nm away from resonant wavelength, $\alpha_{ns}d=2.5*10^{-3}$, $\alpha_0 d=0.25$. The solid line illustrates the top mirror reflectivity satisfying impedance matching at high energy, $R_t=\exp(-\alpha_{ns}*d)$. The dashed line illustrates the top mirror reflectivity decreased to $R_t=96\%$. The bias probe power in both cases is chosen to avoid hysteresis.
Figure 14A:
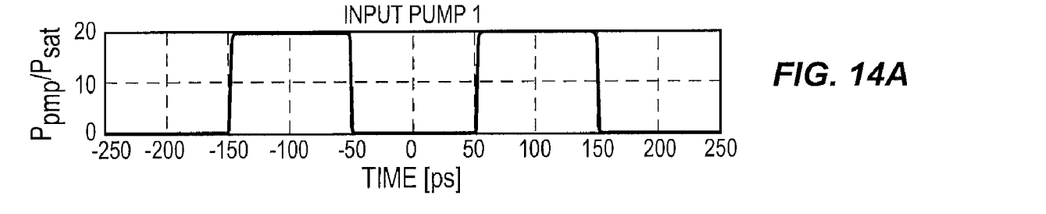
FIGS. 14A-14C illustrate graphical representations corresponding to the dynamic NAND operation shown by the solid line in FIG. 13.
Figure 14B:
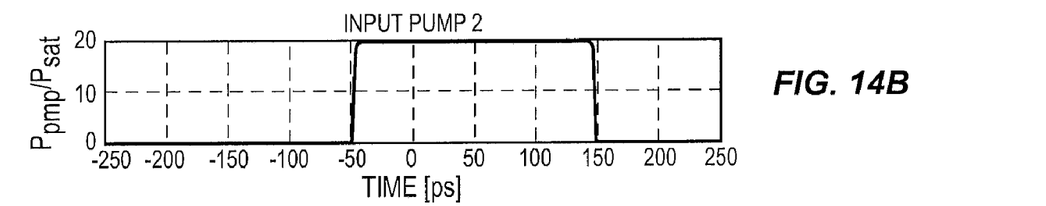
Figure 14C:
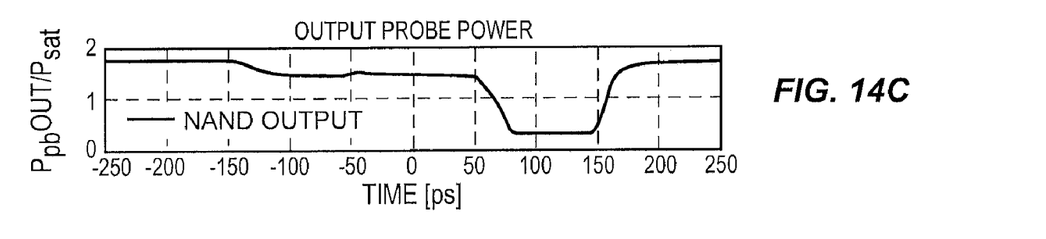
Figure 14D:
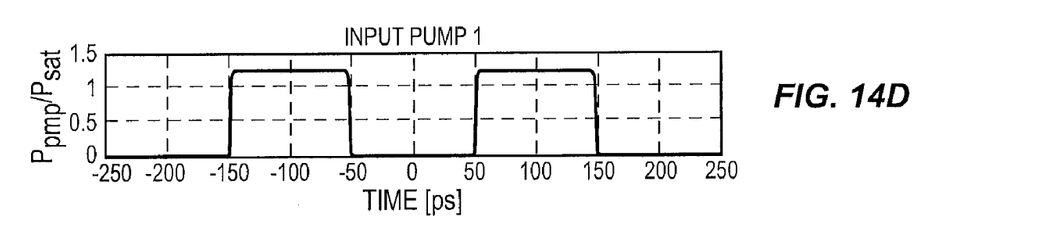
FIGS. 14D-14F illustrate graphical representations corresponding to the dynamic NAND operation shown by the dashed line in FIG. 13.
Figure 14E:
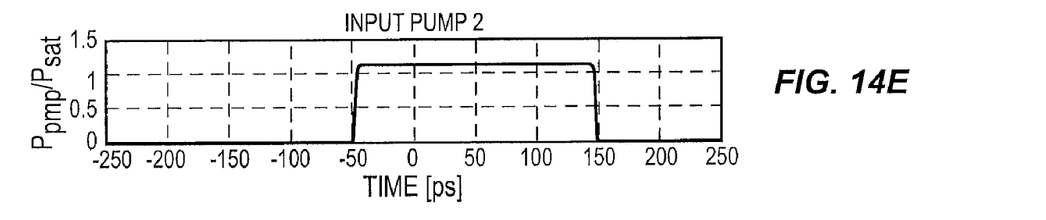
Figure 14F:
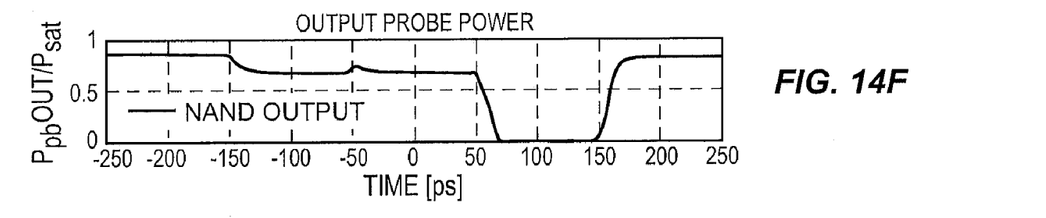

This is shown in by the solid line in FIG. 13 where it can be seen that, for a probe power sufficiently low to avoid bistability, the reflectivity change at resonance induced by a pump field detuned by 1 nm, exhibit a smooth slope in proximity of low reflectivity values (high input energies). Furthermore, it can also be seen that the required operating power is increased. The top mirror reflectivity, in accordance with condition given by eq. (4), is $R_t=\exp(-\alpha_{ns}*d)$. The corresponding dynamic behavior is shown in FIGS. 14A-C. Although NAND operation is somehow preserved, the ER of the output signal is degraded. However, this degradation could be strongly mitigated by impedance matching the gate in correspondence of a partially saturated absorption coefficient ($\alpha_{ns}<\alpha<\alpha_0+\alpha_{ns}$). Namely, the top mirror reflectivity should be lowered below the value needed for impedance matching at high input energy $R_t=\exp(-\alpha_{ns}*d)$. The effect is shown by the dashed line in FIG. 13, where the reflectivity experienced by the probe field is plotted versus the pump power for a top mirror reflectivity of $R_t=96\%$. For a probe power of $P_{pb}=P_{sat}$, the power associated to a single "1" bit pump signal can be chosen to provide high reflectivity for the probe light, while the power associated to two input "1" bit pump signals can be chosen to lie in the low reflectivity region. In this way NAND operation with high ER for the filtered probe light can be obtained. The increased ER is attained at the expense of a slightly reduced gate efficiency (lower reflectivity in the ON state). Beside increasing output ER, lowering the top mirror reflectivity has also two other beneficial consequences: first, it helps prevent hysteresis, since a decreased top mirror reflectivity increases the total losses in the cavity and hence reduce its finesse. As a result, it is now possible to set probe power closer to the transition edge than what would have been possible with $R_t=\exp(-\alpha_{ns}*d)$. Another benefit of reducing $R_t$ is a dramatic decrease of input pump power required for switching the gate, since a lower value of $R_t$ allows more pump field to be effectively coupled inside the cavity. Dynamic simulation of NAND operation relative to the dashed line in FIG. 13 is shown in FIGS. 14D-14F. Furthermore, condition given by eq. (4) for small values of $\alpha_{ns}d$ lead to very high values of $R_t$ that could result unpractical. Lowering $R_t$, could hence result also in easier mirror fabrication.

NOR Operation

Figure 15A:
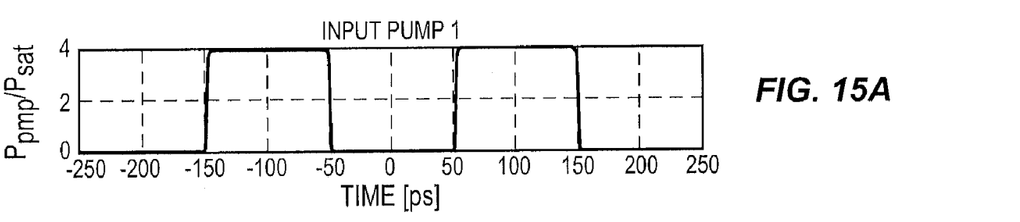
FIGS. 15A-15C illustrate a NOR operation with vertical-cavity semiconductor gate (VCSG) parameters used for the dashed line of FIG. 13.
Figure 15B:
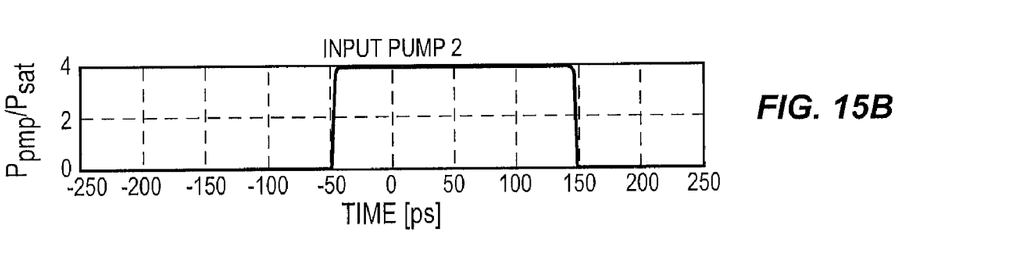
Figure 15C:
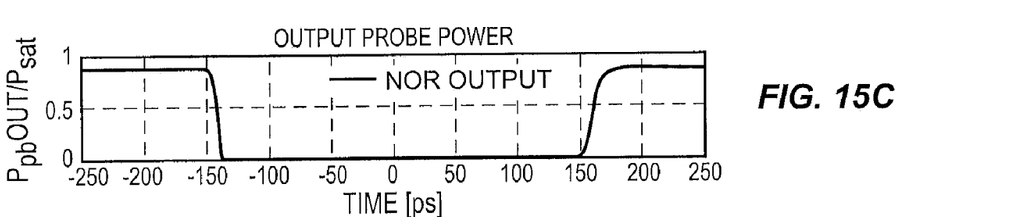

Implementation of NOR operation is straightforward. For what seen, in this case there is less constraint on the steepness of the nonlinear probe reflectivity characteristic induced by the pump field. In this case, indeed, even a relatively smooth characteristic can be tolerated, provided that each pump pulse has enough power to switch the gate in the OFF state. However, low-power operation is always desirable, and we can take advantage of the considerations developed in the previous sub-section to implement efficient, low-power, NOR gate with VCSG. As an example, FIGS. 15A-15C show a NOR operation of the VCSG relative to the case of the dashed line shown in FIG. 13, with a pump power ranging within the low-reflectivity region.

Conclusions

Advantageously, as shown above, a nonlinear VCSG comprises an asymmetric Fabry-Perot resonator including nonlinear absorbing MQWs section enables the realisation of NAND and NOR logical operators. The device relies on the particular design of the cavity which allows an inverse saturable absorber characteristic to be achieved for a probe field tuned at a VCSG resonant wavelength. This is possible by matching the impedance of the gate in correspondence of the non-saturable part of the losses in the cavity. Nonlinear changes of refractive index are not considered here, since they are assumed to be small with respect to large absorption change in the MQWs. However, the analysis could be easily extended to the case in which carrier density concentration-induced index change are also taken into account. In practical applications, the carrier density change in the MQWs would result in a shift of the cavity resonance at steady-state, that could be taken into account by properly tuning the input probe field. Device performances under different cavity parameters conditions have been investigated with the steepest transitions from ON-to-OFF state being achieved, as expected, for the lowest value of non-saturable losses in the cavity. However, in this condition bistability may occur, preventing device correct operation. An heuristic procedure, investigating settling conditions for bistability was also carried out. Nevertheless, some simple design rules for avoiding bistability and preserve good ON/OFF extinction ratio are proposed and numerically verified by means of a dynamic model. The advantage of the device for all-optical signal processing in optical networks applications are related to its compactness, passive operation, polarization insensitivity and possibility of low-power operation.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:
1. An optical logic device comprising:
  a first mirror configured to receive and selectively output radiation from the optical logic device;
  a second mirror facing the first mirror;
  a saturable absorber located between the first and second mirrors, and including a saturable non-linear absorption coefficient dependent on radiation energy;
  the first mirror having a reflectivity such that:

for all received radiation having energies above a given value, the energy of radiation output from the device will remain below a threshold; and for all received radiation having energies below the given value, the energy of exiting radiation will remain above the threshold.

2. The device of claim 1 wherein the reflectivity of the first mirror $R_t$ is substantially equal to:

$$R_b \exp(-2\alpha_{ns}d)$$

where $R_b$ is a reflectivity of the second mirror, d is the distance between mirrors, and $\alpha_{ns}$ is a non-saturable part of the non-linear absorption coefficient.

3. The device of claim 2 wherein the reflectivity of the second mirror is substantially equal to 100%.

4. The device of claim 1 further comprising:

first and second logic signal inputs coupled to the first mirror and configured to receive first and second input binary signals;

wherein the radiation energy received by the first mirror and the reflectivity of the first mirror are configured to implement an optical NAND or NOR logical function.

5. The device of claim 4 wherein the optical logic device is configured to receive a controlled input biasing control signal and at least two input binary signals.

6. The device of claim 5 wherein the optical logic device is configured to implement a NAND or a NOR logical function based on an intensity of the input biasing control signal.

7. The device of claim 5 wherein the input biasing control signal is at a cavity resonance wavelength and the input binary signals are at non-resonant wavelengths.

8. The device of claim 1 wherein the optical logic device is configured as an asymmetric Fabry-Perot cavity.

9. A method of operating an optical logical device comprising a first mirror configured to receive and selectively output radiation from the optical logic device, a second mirror facing the first mirror, and a saturable absorber located between the first and second mirrors, and including a saturable non-linear absorption coefficient dependent on radiation energy, the method comprising:

configuring a reflectivity of the first mirror and the energy of radiation received by the first mirror such that:

for all received radiation having energies above a given value, the energy of radiation output from the device is will remain below a threshold; and for all received radiation having energies below the given value, the energy of exiting radiation is will remain above the threshold.

10. The method of claim 9 further comprising:

inputting at least two binary signals and a biasing control signal to the optical logic device; and controlling relative intensities of the signals to configure the device to operate as a NAND gate or as a NOR gate.

\* \* \* \* \*

UNITED STATES PATENT AND TRADEMARK OFFICE
CERTIFICATE OF CORRECTION

PATENT NO. : 7,907,316 B2
APPLICATION NO. : 12/177433
DATED : March 15, 2011
INVENTOR(S) : Bogoni et al.

Page 1 of 1

It is certified that error appears in the above-identified patent and that said Letters Patent is hereby corrected as shown below:

On the Title Page, in Field (30), under "Foreign Application Priority Data", in Column 1, Line 1, delete "(WO)" and insert -- (EPO) --, therefor.

In Column 3, Line 36, delete "DESCRIPTION" and insert -- DETAILED DESCRIPTION --, therefor.

In Column 5, Line 63, in Equation (10), delete " $\mathcal{J}^2$ " and insert -- $\mathcal{S}^2$ --, therefor.

In Column 6, Line 5, in Equation (11), delete " $\mathcal{J}$ " and insert -- $\mathcal{S}$ --, therefor.

In Column 6, Line 19, delete "a" and insert -- α --, therefor.

In Column 10, Line 11, delete "histeresis" and insert -- hysteresis --, therefor.

In Column 10, Lines 56-57, delete "histeresis" and insert -- hysteresis --, therefor.

In Column 14, Line 20, in Claim 9, after "radiation" delete "is".

Signed and Sealed this
Fifteenth Day of November, 2011

David J. Kappos
*Director of the United States Patent and Trademark Office*